United States Patent [19]

Molny

[11] 4,009,603
[45] Mar. 1, 1977

[54] ZERO SPEED CALIBRATION METHOD AND APPARATUS FOR USE WITH AN ELECTRO-MAGNETIC UNDERWATER LOG FOR MARINE VESSELS

[75] Inventor: Marvin J. Molny, Huntington, N.Y.

[73] Assignee: Sperry Rand Corporation, New York, N.Y.

[22] Filed: Feb. 13, 1976

[21] Appl. No.: 657,900

[52] U.S. Cl. .................................. 73/3; 73/194 EM
[51] Int. Cl.² ..................... G01F 1/64; G01F 25/00
[58] Field of Search ................ 73/1 R, 1 D, 3, 181, 73/189, 194 EM

[56] References Cited

UNITED STATES PATENTS

| 3,717,031 | 2/1973 | Bisian | 73/194 EM |
| 3,805,768 | 4/1974 | Barefoot et al. | 73/194 EM X |
| 3,965,738 | 6/1976 | Watanabe | 73/194 EM |

Primary Examiner—Donald O. Woodiel
Assistant Examiner—Charles Gorenstein
Attorney, Agent, or Firm—Howard P. Terry; Joseph M. Roehl

[57] ABSTRACT

Two embodiments of a zero speed calibrator for a known type of electro-magnetic underwater log are disclosed. In a presently preferred embodiment, switching means are provided to connect the excitation source of the log to the magnetic field-generating coil in the sensor unit during normal operation, but to disconnect the excitation source from the coil and substitute dummy loads across the excitation source and the coil, respectively, during zero calibration procedures without disturbing the voltage-sensing circuit. In another embodiment, a special cable segment is inserted in the connecting cable during zero calibration procedures. The special cable segment contains dummy loads constructed so that insertion of the special segment automatically connects the dummy loads across the source and coil, respectively, while still providing a direct connection in the voltage-sensing circuit.

6 Claims, 5 Drawing Figures

ZERO SPEED CALIBRATION METHOD AND APPARATUS FOR USE WITH AN ELECTRO-MAGNETIC UNDERWATER LOG FOR MARINE VESSELS

BACKGROUND OF THE INVENTION

1. Field of the Invention

The present invention relates to navigation instruments and more specifically to marine speed logs.

2. Description of the Prior Art

Known types of electro-magnetic underwater logs for marine vessels utilize an on-board indicator/transmitter unit which provides an energizing current through a connecting cable to a submerged sensing unit. The sensing unit contains a coil energized by this current so as to establish a magnetic field in the surrounding water. Water flow through this magnetic field as a result of the vessel's motion induces a voltage gradient in the water. The voltage is detected by a pair of metallic buttons in the sensor, and applied to the transmitter by means of a second pair of cables. Such logs must occasionally be calibrated at the zero speed point, which in the past has involved a complicated procedure. One prior art zero point calibration technique involved the establishment of zero water flow past the sensor. This must be done at dockside or at anchor, since establishment of zero speed at sea is difficult and may disrupt other operations. Zero water flow dockside or at anchor may be obtained either by waiting for slack tide or by shrouding the sensor. With either approach, there is a risk of encountering in-water voltages produced by electrical equipment on shore, and therefore incorrectly estimating the zero speed error.

Another technique involves the deletion of the sensor output. This is done either by artificially forcing the sensor signal to zero by short circuiting the sensor output, or by replacing the sensor signal with an artificial signal. This method permits correction of errors originating within the electronic portion of the indicator/transmitter but does not permit compensation for erroneous indications produced by pick-up in the cables connecting the indicator/transmitter to the sensor or for errors associated with the in-water voltages produced by the ship's own electrical equipment.

SUMMARY OF THE INVENTION

Zero speed calibration of an electro-magnetic underwater log is achieved by electrically simulating the zero speed condition without suppressing the error component of the log output so as to permit measurement and compensation for this component even when the ship's speed is not actually zero and while the ship is at sea.

DESCRIPTION OF THE PREFERRED EMBODIMENTS

Figure 1A:
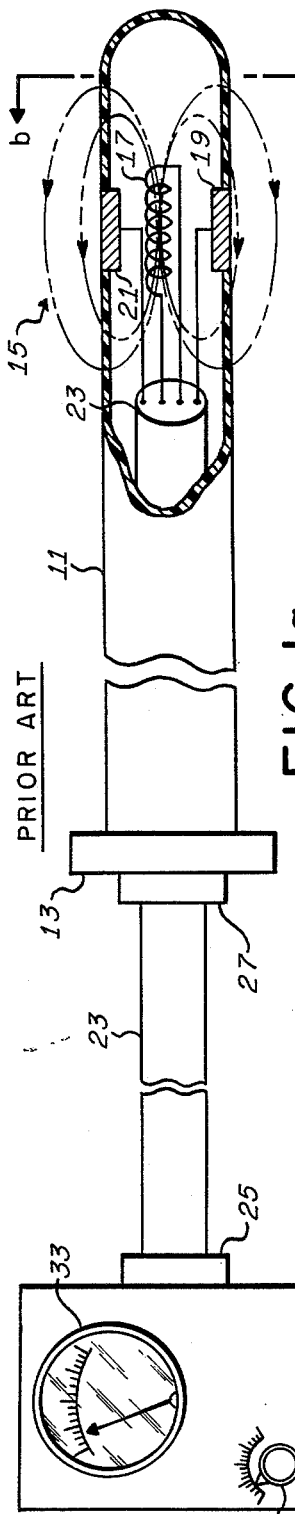
FIG. 1a is a sketch of an electro-magnetic underwater log of the type to which the invention may be applied.

FIG. 1a is a functional illustration of a prior art electro-magnetic underwater log. An elongated, submersible sensing means 11 is mounted by conventional mounting means 13 so as to project from the ship's hull. Typically, the sensing means 11 is an elongated, flattened tube having sufficient length so that it projects into the relatively smooth-flowing water remote from the turbulence occurring adjacent the ship's hull. The actual sensor unit 15 is mounted within the submersible sensing means 11 and includes an electrical coil 17 and metallic voltage-sensing buttons 19 and 21. The portion of the submersible sensing means 11 in the vicinity of the sensor unit 15 is constructed from a plastic or other non-magnetic, non-conducting, watertight material, so as to permit flux from the electrical coil 17 to establish a magnetic field in the adjacent water and to insulate the voltage-sensing buttons from each other. The electrical coil and the voltage-sensing buttons are connected to elements in the indicator/transmitter through a connecting cable 23. Since the indicator/transmitter unit is ordinarily mounted at a convenient location within the ship, whereas the submersible sensing means is ordinarily mounted near the keel at the forward end of the ship, the interconnecting cable 23 between these two units may well have a length of hundreds of feet. This section of cable is ordinarily detachably connected to the indicator/transmitter and the submersible sensing means by means of connectors 25 and 27.

An oscillator or other low frequency source in the indicator/transmitter energizes the electrical coil 17 so as to produce an alternating magnetic flux as indicated in FIG. 1a.

Figure 1C:
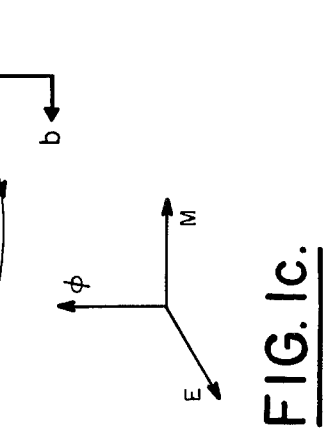
FIG. 1c illustrates the relationship between the ship's motion, the magnetic flux, and the voltage gradient, according to Faraday's principle.
Figure 1B:
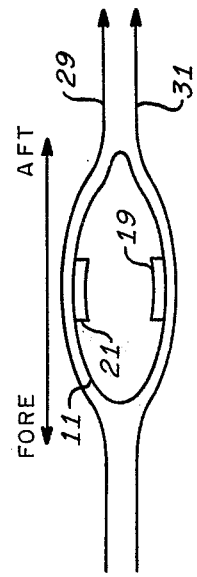
FIG. 1b represents an end view of the sensing means.

When the vessel is under way, the water flows over the surface of the sensing means 11 along streamlined paths 29 and 31 as indicated in FIG. 1b which represents an end-view of the sensing means 11. Since the water has appreciable conductivity, when the vessel is under way, the water flow over the surface of the sensing means 11 cuts the lines of magnetic flux and generates an electrical voltage in accordance with Faraday's principle. This relationship is illustrated in FIG. 1c. The flux $\phi$ is essentially along the axis of the submersible sensing means and the motion of the conductor (water), as indicated by the vector M, is essentially at right angles to this component of the flux. Therefore, a voltage gradient E is established in the water and detected by the voltage-sensing buttons 19 and 21. Since the voltage gradient is proportional to the velocity of the conductor, the voltages detected by the voltage sensing buttons are proportional to ship's speed, and can be applied through the connecting cable to the indicator/transmitter so as to actuate an indicator 33 graduated in knots or other suitable units. The indicator/transmitter may include equipment which can activate remotely located, secondary indicators.

As the flow characteristics of the water around the vessel in which the log is installed influence the accuracy of the system, each log must be calibrated to the particular vessel before maximum accuracy will be obtained. One of the most crucial adjustments is the zero speed calibration which is typically carried on before operating the log underway. The actual adjustment is made by means of a "zero adjust" potentiometer 35 which is set to provide a zero reading on the indicator 33 when the vessel is in perfectly still water at dockside. As indicated previously, the present invention overcomes the difficulty and inconvenience of such prior art zero calibration procedures.

Figure 2:
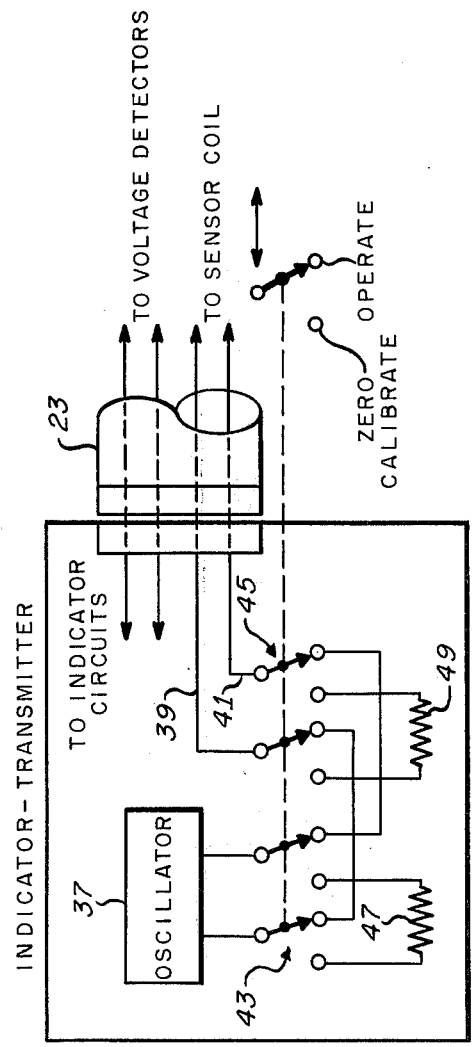
FIG. 2 is a sketch illustrating one embodiment of the invention.

As presently preferred, the principles of the invention may be applied to the log by modifying the indicator/transmitter as indicated in FIG. 2.

In the original log, the oscillator 37 which is used as a coil energizing means is connected directly to the sensor coil through the lines 39 and 41 in the cable 23. In accordance with the principles of the invention, switching means such as the double pole-double throw switches 43 and 45 are inserted in the lines 39 and 41. Under normal operating conditions, the oscillator is directly coupled to the sensor coil when the switches are in the position shown in FIG. 2. Opposite terminals of the switch 43 are shunted by a first dummy load 47 having an impedance equal to that normally seen by the oscillator 37. The remaining terminals of the switch 45 are shunted by a second dummy load 49 having an impedance equal to that normally provided by the sensor coil and transmission line. When a zero calibrate procedure is to be executed, the switch is thrown to the zero calibrate position so that the impedance 47 absorbs the output of the oscillator 37 and the impedance 49 simulates the impedance normally presented to the sensor coil circuit. The lines interconnecting the indicator circuits and the voltage detectors are left intact in this embodiment of the invention.

Figure 3:
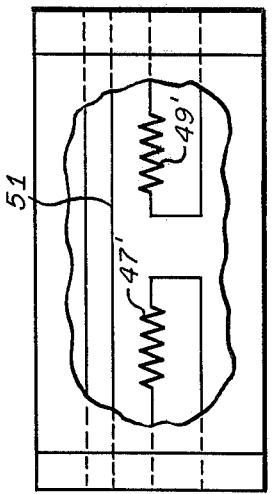
FIG. 3 is a sketch illustrating a second embodiment of the invention.

In situations where modification of the indicator/transmitter as depicted in FIG. 2 is not feasible, the special cable segment depicted in FIG. 3 may be inserted in the line 23 at the connector 25 adjacent the indicator/transmitter or at the connector 27 adjacent to the submersible sensing means.

The special cable segment contains a pair of feed-through lines 51 which maintain the direct connection between the voltage detectors and the indicator circuits when the special cable segment is in place. The special cable segment further contains a pair of dummy loads 47' and 49' which are automatically coupled across the oscillator 37 and the lines to the sensor coil, respectively, when the special cable segment is inserted. With this embodiment it is necessary to detach the connecting cable 23 at the appropriate connector and physically insert the line segment whenever a zero calibration procedure is to be executed. However, use of this embodiment of the invention obviates the task of re-wiring the indicator/transmitter necessitated by the embodiment of the invention depicted in FIG. 2.

Regardless of the particular structure employed, the zero calibration technique of the present invention involves three steps, namely:
1. disconnecting the electrical coil from the energizing means;
2. terminating the electrical coil and the energizing means with suitable dummy loads;
3. adjusting the indicator/transmitter to indicate zero velocity.

With either embodiment, when the circuit is connected to operate in the calibrate mode, the current to the electrical coil is interrupted but the interconnections between the voltage sensing buttons and the indicator circuits is undisturbed. Since the oscillator energizes various components in the indicator/transmitter as well as the sensor coil, the matching impedance of a dummy load across the oscillator not only protects the circuits from possible burn-out, but insures maintenance of the proper phase relationships between the various circuit components. The matching impedance of the dummy load across the sensor coil insures that the lines in the coil circuit will retain their normal impedance during the calibration procedure so that the magnitude and phase of any cable pickup will be the same during calibration as it would be during normal operation.

With the excitation to the coil removed, water flow past the sensor unit can no longer produce a voltage gradient. However, retention of the voltage-sensing circuit insures that any other voltage gradients in the vicinity of the sensor, and any voltages induced by cable pickup of stray fields within the ship will reach the indicator/transmitter. These voltages and the imperfections of the indicator/transmitter itself cause the erroneous speed indications which comprise the zero-speed error and which are all balanced out when the zero set potentiometer is adjusted to obtain zero velocity indication.

Because of the removal of the coil excitation, the invention simulates the zero speed condition even when the vessel is under way. Because of the retention of the voltage-sensing circuit, all possible sources of zero-speed error continue to effect the log system as during normal operation. This combination of features permits accurate correction of the zero-speed error at sea, remote from any disturbances produced by on-shore electrical equipment that would otherwise affect calibration procedures made at dockside.

While the invention has been described in its preferred embodiments, it is to be understood that the words which have been used are words of description rather than limitation and that changes within the purview of the appended claims may be made without departing from the true scope and spirit of the invention in its broader aspects.

I claim:

1. An improved electro-magnetic underwater log for measuring the speed of a marine vessel, said log being of the type that includes a submersible sensor unit having an electrical coil for establishing a magnetic field with a component essentially perpendicular to the direction of the vessel's forward motion and voltage sensing means for detecting the voltage gradients induced in water flowing through said magnetic field by virtue of the fore-aft motion of the vessel, said log further including means to energize said coil, and adjustable indicating means responsive to said detecting means for displaying the speed of the vessel, said improvement consisting of zero speed calibration apparatus comprising means to disconnect the energizing means from the coil and to substitute a dummy load across the coil, and means to set said indicator means to zero value when said coil is terminated by the dummy load.

2. The improved log of claim 1 wherein the means to substitute the dummy load across the coil further includes means to connect a second dummy load across the output of said energizing means.

3. The improved log of claim 2 wherein said dummy load and said second dummy load are each selected to provide an impedance equal to the impedance seen by the coil and the energizing means, respectively, during normal operation of the log.

4. The improved log of claim 2 wherein the energizing means and the adjustable indicating means are mounted in an indicator/transmitter unit on board the vessel and a detachable cable interconnects the indicator/transmitter unit and the submersible sensor unit, said improvement being further characterized in that said disconnecting means and said substituting means includes a special cable segment insertable between the indicator/transmitter unit and the detachable cable during the zero calibration procedure, said special cable segment containing said dummy load, said second dummy load, means for coupling each load to its respective source, and further means for coupling said voltage sensing means directly to said adjustable indicating means.

5. The improved log of claim 3 wherein the disconnecting means and the substituting means is a double throw switch arranged to couple the output of said energizing means directly across said electrical coil when the switch is in an operate position, and to couple said dummy load across the coil and said second load across the energizing means when the switch is in a zero calibrate position.

6. A method for calibrating an electro-magnetic underwater log used for indicating the speed of a marine vessel, said log being of the type having submersible sensing means and on-board indicator/transmitter means, said submersible sensing means including coil means for establishing a magnetic field and detecting means for detecting voltage gradients induced in the water flowing through said magnetic field, said indicator/transmitter means including means for energizing said coil and adjustable indicating means responsive to the magnitude of the detected voltage gradients for indicating the speed of the vessel, said method comprising the steps of disconnecting said energizing means from said coil means, terminating said coil means and said energizing means with individual loads, energizing said log and adjusting said indicating means to a zero speed reading.

* * * * *